United States Patent
Kim et al.

(10) Patent No.: US 10,038,206 B2
(45) Date of Patent: Jul. 31, 2018

(54) HUMIDIFICATION APPARATUS FOR FUEL CELL SYSTEM

(71) Applicant: Hyundai Motor Company, Seoul (KR)

(72) Inventors: Hyun Yoo Kim, Seoul (KR); Hyuck Roul Kwon, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 429 days.

(21) Appl. No.: 14/946,349

(22) Filed: Nov. 19, 2015

(65) Prior Publication Data

US 2016/0079619 A1     Mar. 17, 2016

Related U.S. Application Data

(62) Division of application No. 13/900,838, filed on May 23, 2013, now Pat. No. 9,225,026.

(30) Foreign Application Priority Data

Dec. 28, 2012   (KR) .................. 10-2012-0156435

(51) Int. Cl.
*H01M 8/04492* (2016.01)
*H01M 8/04119* (2016.01)
(Continued)

(52) U.S. Cl.
CPC ... *H01M 8/04492* (2013.01); *H01M 8/04126* (2013.01); *H01M 8/04141* (2013.01);
(Continued)

(58) Field of Classification Search
CPC ......... H01M 8/04149; H01M 8/04141; H01M 8/04425; G06F 3/00; G06F 8/665; G05F 5/00
See application file for complete search history.

(56) References Cited

FOREIGN PATENT DOCUMENTS

JP     2008027674 A    2/2008
JP    2008-103115 A    5/2008
(Continued)

OTHER PUBLICATIONS

Machine Translation of: JP 2008/027674 A1, Usuda et al., Feb. 7, 2008.*

(Continued)

*Primary Examiner* — Kenneth J Douyette
(74) *Attorney, Agent, or Firm* — Mintz Levin Cohn Ferris Glovsky and Popeo, P.C.; Peter F. Corless

(57) ABSTRACT

A humidification apparatus for a fuel cell system is provided herein. A membrane humidifier includes humid air inlets, through which humid air discharged from a cathode of a fuel cell stack is introduced, and air outlets, through which air humidifying dry air in hollow fiber membranes is discharged, an air line connected from a cathode outlet of the fuel cell stack to the humid air inlets of the membrane humidifier to supply humid air. Exhaust lines are connected to the air outlets. A flow control valve is provided in the air line and controls the introduction of humid air into the humid air inlets, respectively. An exhaust valve is also provided to open and close flow paths of the exhaust lines. A controller controls the opening and closing of the flow control valve and the exhaust valve based on operating conditions of the fuel cell stack.

5 Claims, 6 Drawing Sheets

(51) Int. Cl.
*H01M 8/0438* (2016.01)
*G06F 9/445* (2018.01)
*G06F 3/00* (2006.01)
*G05F 5/00* (2006.01)
*G06F 8/654* (2018.01)

(52) U.S. Cl.
CPC ... *H01M 8/04149* (2013.01); *H01M 8/04425* (2013.01); *G05F 5/00* (2013.01); *G06F 3/00* (2013.01); *G06F 8/654* (2018.02); *G06F 8/665* (2013.01); *H01M 2250/20* (2013.01); *Y02E 60/50* (2013.01); *Y02T 90/32* (2013.01)

(56) References Cited

FOREIGN PATENT DOCUMENTS

| | | |
|---|---|---|
| JP | 2008-226658 A | 9/2008 |
| JP | 2011-075242 A | 4/2011 |
| JP | 2012015120 A | 1/2012 |
| JP | 2012109182 A | 6/2012 |
| KR | 10-2007-0051477 | 5/2007 |
| KR | 10-2010-0132194 | 12/2010 |
| KR | 10-2012-0061664 | 6/2012 |

OTHER PUBLICATIONS

Y. Wang, "Modeling of two-phase transport in the diffusion media of polymer electrolyte fuel cells", Journal of Power Sources, 185 (2008) 261-271.

\* cited by examiner

HUMIDIFICATION APPARATUS FOR FUEL CELL SYSTEM

CROSS-REFERENCE TO RELATED APPLICATION

This application is a divisional application of U.S. application Ser. No. 13/900,838, filed May 23, 2013, now U.S. Pat. No. 9,225,026, which claims under 35 U.S.C. § 119(a) the benefit of Korean Patent Application No. 10-2012-0156435 filed Dec. 28, 2012, the entire contents of which are incorporated herein by reference.

CROSS-REFERENCE TO RELATED APPLICATION

This application claims under 35 U.S.C. § 119(a) the benefit of Korean Patent Application No. 10-2012-0156435 filed Dec. 28, 2012, the entire contents of which are incorporated herein by reference.

BACKGROUND (a) Technical Field

The present invention relates to a humidification apparatus for a fuel cell system. More particularly, the present invention relates to a humidification apparatus for a fuel cell system, which can control the amount of dry air to be humidified by a membrane humidifier based on operating conditions of the fuel cell system.

(b) Background Art

One of the most attractive fuel cells for a vehicle is a polymer electrolyte membrane fuel cell (PEMFC), also called a proton exchange membrane fuel cell, which includes: a membrane electrode assembly (MEA) including a polymer electrolyte membrane (PEM) for transporting hydrogen ions and an electrode catalyst layer, in which an electrochemical reaction takes place, disposed on both sides of the PEM; a gas diffusion layer (GDL) for uniformly diffusing reactant gases and transmitting generated electricity; a gasket and a sealing member for maintaining airtightness of the reactant gases and coolant and providing an appropriate bonding pressure; and a bipolar plate for transferring the reactant gases and coolant.

In a fuel cell having the above-described configuration, hydrogen as a fuel and oxygen (air) as an oxidant are supplied to an anode and a cathode through flow fields of the bipolar plate, respectively. The hydrogen is supplied to the anode and the oxygen (air) is supplied to the cathode.

The hydrogen supplied to the anode is dissociated into hydrogen ions (protons, $H^+$) and electrons ($e^-$) by a catalyst of the electrode catalyst layer provided on both sides of the electrolyte membrane. At this time, only the hydrogen ions are selectively transmitted to the cathode through the electrolyte membrane, which is a cation exchange membrane and, at the same time, the electrons are transmitted to the anode through the GDL and the bipolar plate, which are conductors.

At the cathode, the hydrogen ions supplied through the electrolyte membrane and the electrons transmitted through the bipolar plate meet the oxygen in the air supplied to the cathode by an air supplier and cause a reaction that produces water. Due to the movement of hydrogen ions occurring at this time, the flow of electrons through an external conducting wire occurs, and thus a current is suitably generated.

Furthermore, the PEMFC requires water for its operation and, to this end, the air (or oxygen) supplied to the cathode of the fuel cell is humidified by a humidifier. Although there are various humidification methods such as bubbler, steam injection, adsorption, etc., a membrane humidifier having a relatively small volume is widely employed in the fuel cell vehicle due to spatial limitations. The membrane humidifier also does not require any power.

FIG. 1 is a schematic diagram showing a typical humidification apparatus for a fuel cell system, which humidifies air using a membrane humidifier. As shown in the figure, external dry air is forcibly passed through a membrane humidifier 10 by an air blower 1 and, at this time, supersaturated humid air containing water discharged from an outlet of a fuel cell stack 20 passes through the membrane humidifier 10 such that the dry air is humidified by water exchange between the supersaturated humid air and the dry air and the humidified air is supplied to the fuel cell stack 20.

A typical membrane humidifier is a gas-to-gas membrane humidifier that employs hollow fiber membranes. In this type of membrane humidifier, the hollow fiber membranes having a high contact surface area can be highly integrated, and thus it is possible to provide sufficient humidification to the fuel cell stack with a small capacity. Moreover, since the water and heat contained in the gas discharged from the fuel cell stack are collected and reused by the membrane humidifier, it is possible to save water and energy consumed for the humidification of the fuel cell stack.

One of the factors that has a significant effect on the performance during the operation of the fuel cell is to supply a sufficient amount of water to the electrolyte membrane and ionomers in the catalyst layer, which are the key components of the fuel cell, to maintain moisture content, thus maximizing the ionic conductivity of the electrolyte membrane and the ionomers. Here, the membrane humidifier serves to supply moisture and heat contained in high-temperature gas discharged from the fuel cell stack to dry reaction gas at room temperature supplied to the fuel cell stack via the membrane surface, thus achieving the humidification of the fuel cell stack and maintaining the temperature of the fuel cell stack.

Next, the structure of the membrane humidifier will be described in detail.

FIG. 2 is a perspective view showing a typical membrane humidifier, and FIG. 3 is an exploded perspective view of the membrane humidifier. As shown in FIGS. 2 and 3, a membrane humidifier 10 includes a membrane module 11 with a structure, in which hollow fiber membranes 11c are fixed in a case 11a, and a first housing 13 and a second housing 14 which are assembled on both ends of the case 11a of the membrane module 11 and include inlets 13a and 13b and an outlet 14a, respectively.

Here, the hollow fiber membranes 11c are arranged in the form of a bundle in the case 11a of the membrane module 11, and end ends of the hollow fiber membrane bundle 11c are fixed at both inner ends of the case 11a by potting portions 11b, and thus the position of the hollow fiber membrane bundle 11c is fixed in the case 11a.

However, the above-described conventional membrane humidifier for the fuel cell has the following problems.

Although sufficient humidification is required in a low current region of the fuel cell, a large amount of water is also produced in high power and high current regions, which increases the mass transfer resistance in the cathode. This may cause flooding and the large amount of water blocks the air supply, which results in air starvation in the cathode. As a result, the deterioration of the fuel cell catalyst and high current regions, but the difference in the amount of humidification between the high current region and the low current region is insignificant in the conventional membrane humidifier and a high humidity of 80% RH is provided even in the high current region, which is similar to that in the low current region. Moreover, it is impossible to control the amount of humidification by the membrane humidifier itself based on operating loads of the fuel cell. Furthermore, the flow rate of air increases in the high current region, which increases the pressure drop and the load of the air blower, which is problematic.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a humidification apparatus for a fuel cell system, which is configured to control the amount of dry air to be humidified by a membrane humidifier based on operating conditions of a fuel cell stack, thus effectively preventing the occurrence of flooding in a cathode of the fuel cell stack and solving various conventional problems such as performance reduction, local air starvation in the cathode, etc.

In one aspect, the present invention provides a humidification apparatus for a fuel cell system. A membrane humidifier includes humid air inlets, through which humid air discharged from a cathode of a fuel cell stack is introduced, formed at front and rear ends thereof, respectively, and air outlets, through which air humidifying dry air in hollow fiber membranes is discharged, formed at front and rear ends thereof, respectively, an air line connected from a cathode outlet of the fuel cell stack to the humid air inlets of the membrane humidifier to supply humid air. Exhaust lines are connected to the air outlets, respectively, so that the air after humidification is discharged therethrough. A flow control valve is provided in the air line and controls the introduction of humid air into the humid air inlets, respectively. An exhaust valve is also provided to open and close flow paths of the exhaust lines. A controller controls the opening and closing of the flow control valve and the exhaust valve based on operating conditions of the fuel cell stack.

In an exemplary embodiment, the air line may be branched into branch lines connected to the humid air inlets, respectively, and the flow control valve may be a 3-way valve provided at the branch of the air line to selectively open and close flow paths to the branch lines or to control the flow rate of humid air to the branch lines.

In another exemplary embodiment, the exhaust lines connected to the air outlet at the front end and the air outlet at the rear end may be combined into a single line and the exhaust valve may be a 3-way valve installed at the combined point of the exhaust lines.

In still another exemplary embodiment, separate exhaust lines, through which the air after the humidification is discharged, may be connected to the air outlet at the front end and the air outlet at the rear end, respectively, and separate exhaust valves may be provided in the exhaust lines, respectively.

In yet another exemplary embodiment, the controller may be configured to control the opening and closing of the flow control valve and the exhaust valve based on the output of the fuel cell stack to control the flow rate of humid air in a counter-flow, where the humid air passes through the membrane humidifier in a direction reverse to the flow direction of air in the hollow fiber membranes in the membrane humidifier, and the flow rate of humid air in a co-flow, where the humid air passes through the membrane humidifier in the same direction as the flow direction of air in the hollow fiber membranes of the membrane humidifier.

In still yet another exemplary embodiment, in low output and low current regions where the output of the fuel cell stack is below a predetermined reference value, the controller may block the introduction of humid air into the humid air inlet formed at the rear end of the membrane humidifier and controls the opening and closing of the flow control valve and the exhaust valve such that humid air introduced into the humid air inlet formed at the front end of the membrane humidifier passes through the membrane humidifier only in the counter-flow direction.

In a further exemplary embodiment, in high output and high current regions where the output of the fuel cell stack exceeds a predetermined reference value, the controller may control the opening and closing of the flow control valve and the exhaust valve such that humid air discharged from the cathode of the fuel cell stack are introduced into both the humid air inlets formed at the front and rear ends of the membrane humidifier and passes through the membrane humidifier in both the counter-flow and co-flow directions.

In another further exemplary embodiment, in the high output and high current regions, the controller controls the opening and closing of the flow control valve and the exhaust valve to increase the flow rate of humid air in the co-flow direction as the output of the fuel cell stack is higher.

In still another further preferred exemplary embodiment, in high output and high current regions where the output of the fuel cell stack exceeds a predetermined reference value, the controller blocks the introduction of humid air into the humid air inlet formed at the front end of the membrane humidifier and controls the opening and closing of the flow control valve and the exhaust valve such that humid air introduced into the humid air inlet formed at the rear end of the membrane humidifier passes through the membrane humidifier only in the co-flow direction.

Other aspects and exemplary embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
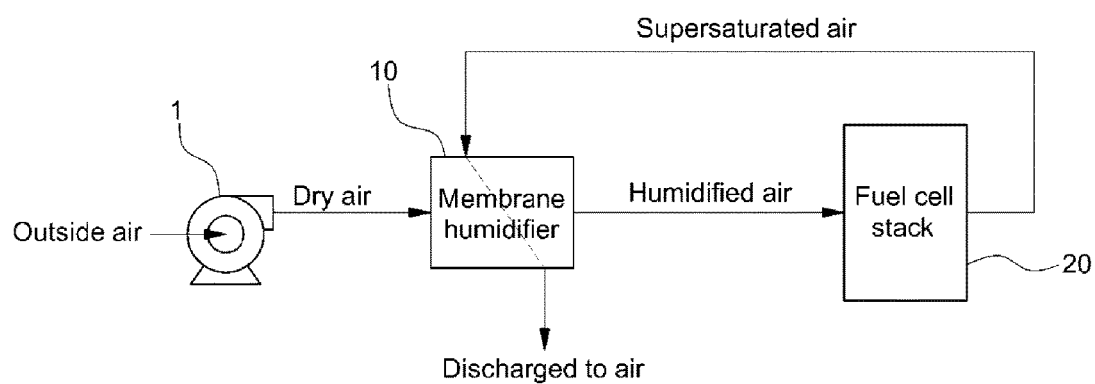
FIG. 1 is a schematic diagram showing a typical humidification apparatus for a fuel cell system, which humidifies air using a membrane humidifier.
Figure 2:
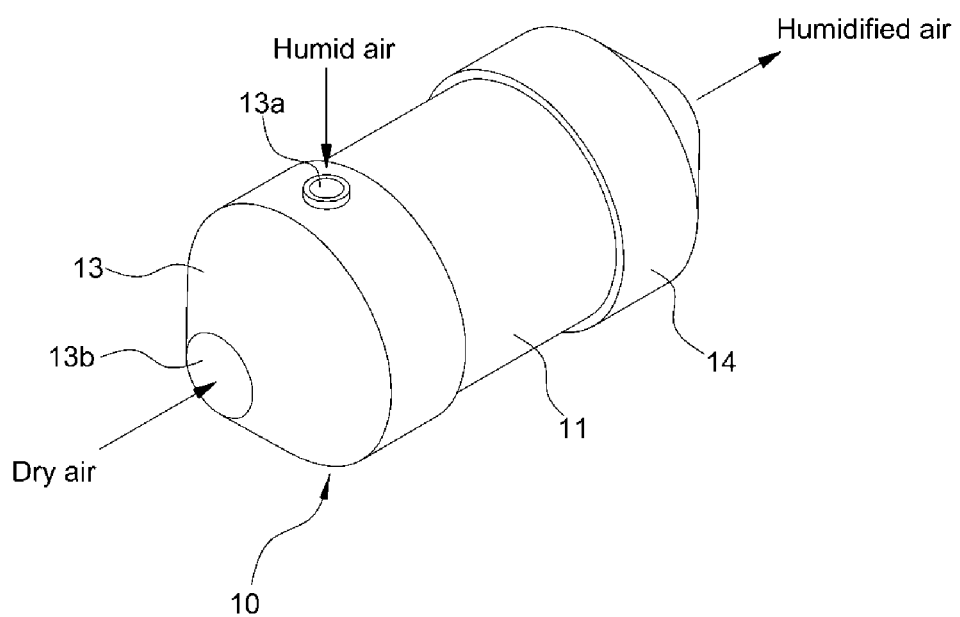
FIG. 2 is a perspective view showing a typical membrane humidifier.
Figure 3:
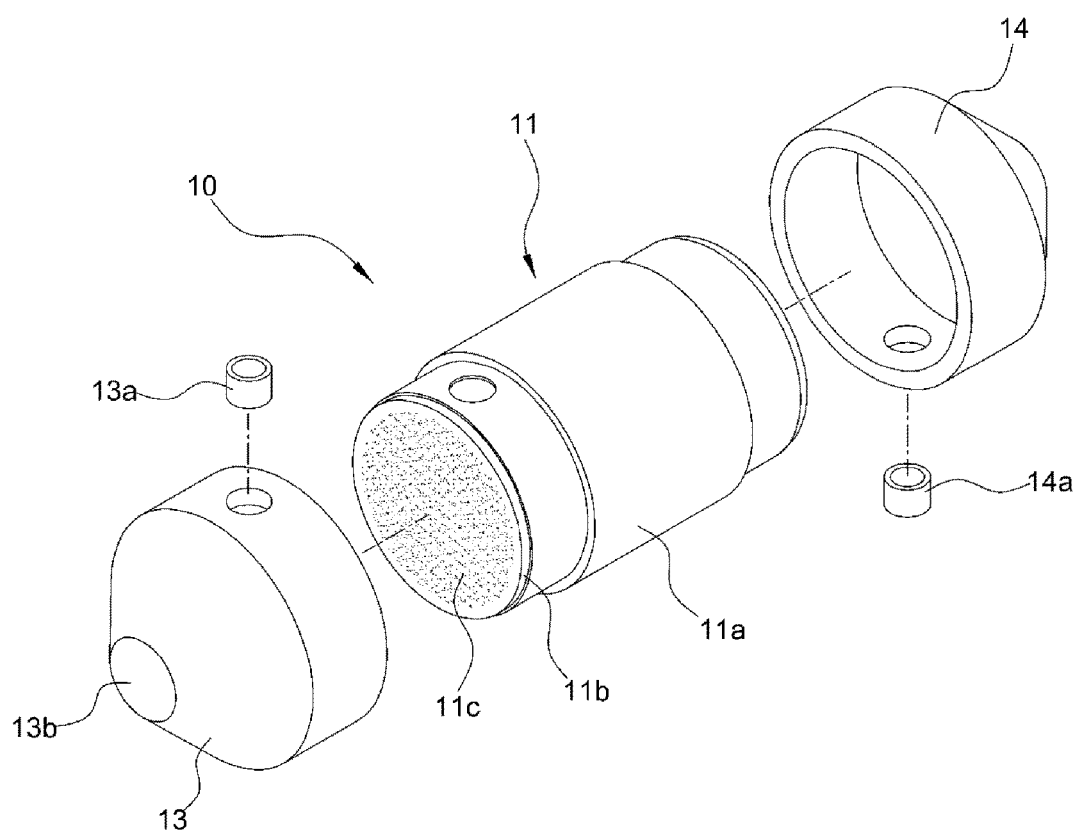
FIG. 3 is an exploded perspective view of the typical membrane humidifier.

Reference numerals set forth in the Drawings includes reference to the following elements as further discussed below:

| | |
|---|---|
| 10: membrane humidifier | 11: membrane module |
| 11a: case | 11b: potting portion |
| 11c: hollow fiber membrane | 13: first housing |
| 14: second housing | 15a: first humid air inlet |
| 15b: second humid air inlet | 16a: dry air inlet |
| 16b: humidified air outlet | 17a: first air outlet |
| 17b: second air outlet | 20: fuel cell stack |
| 31: air line | 31a & 31b: branch lines |
| 32: flow control valve | 33a & 33b: exhaust lines |
| 34: exhaust valve | 34a: first exhaust valve |
| 34b: second exhaust valve | |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Figure 4:
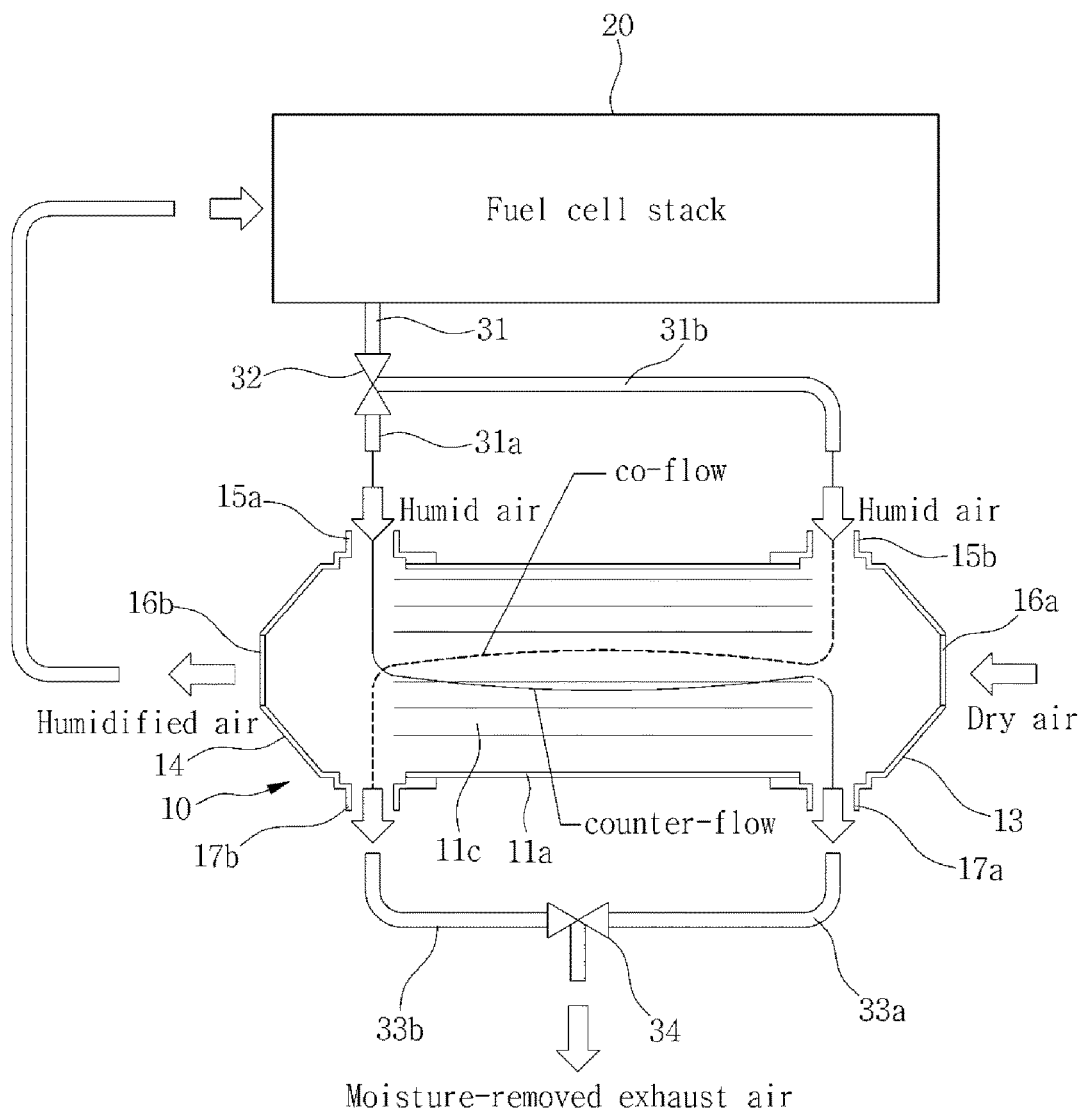
FIG. 4 is a schematic diagram showing the configuration of a humidification apparatus for a fuel cell system in accordance with an exemplary embodiment of the present invention.

FIG. 4 is a schematic diagram showing the configuration of a humidification apparatus for a fuel cell system in accordance with an exemplary embodiment of the present invention. As shown in the figure, a humidification apparatus for a fuel cell system in accordance with an exemplary embodiment of the present invention includes a membrane humidifier 10 configured to humidify dry air by moisture transfer through hollow fiber membranes 11c and supply the humidified air to a fuel cell stack 20.

In the humidification apparatus including the membrane humidifier, external dry air is forcibly passed through the membrane humidifier 10 by an air blower, not shown, and at this time, supersaturated humid air containing water discharged from a cathode outlet of the fuel cell stack 20 is passed through the membrane humidifier 10 so that the dry air is humidified by water exchange between the humid air and the dry air and the humidified air is supplied as an oxidant required for the electrochemical reaction to a cathode inlet fuel cell stack 20.

Here, the membrane humidifier 10 of the present invention includes a membrane module 11 with a structure in which hollow fiber membranes 11c are fixed in a case 11a, and a first housing 13 and a second housing 14 which are assembled to both ends of the case 11a of the membrane module 11, respectively. Moreover, the membrane humidifier 10 of the present invention may have two humid air inlets 15a and 15b (the conventional membrane humidifier has a single humid air inlet) through which the humid air discharged through the cathode outlet is introduced and, at the same time, has a single dry air inlet 16a through which the dry air blown by the air blower is introduced.

Here, the two humid air inlets 15a and 15b are configured to introduce the humid air discharged from the cathode outlet of the fuel cell stack 20 into the membrane humidifier 10 for the air humidification and are provided at both ends in the longitudinal direction of the membrane humidifier 10. The longitudinal direction of the membrane humidifier 10 is the same as the longitudinal direction of the hollow fiber membranes 11c and the same as the flow direction of the dry air introduced through the dry air inlet 16a into the membrane humidifier 10 and humidified.

Moreover, the membrane humidifier 10 of the present invention has two air outlets 17a and 17b (the conventional membrane humidifier has a single air inlet) through which the air introduced through the humid air inlets 15a and 15b into the membrane humidifier 10 and subjected to moisture exchange with the dry air (i.e., the air from which moisture is removed) is discharged and, at the same time, has a single humidified air outlet 16b through which the air humidified by moisture exchange is discharged. Here, the two air outlets 17a and 17b are configured to discharge the air, from which moisture is removed by humidifying the dry air in the membrane humidifier 10, to the outside of the membrane humidifier 10 and are provided at both ends in the longitudinal direction of the membrane humidifier 10.

In the above-described configuration, the dry air inlet 16a and the humidified air outlet 16b are formed at both ends of the membrane humidifier 10, i.e., at the ends of the first housing 13 and the second housing 14, respectively, in the same manner as the conventional membrane humidifier. Here, the dry air inlet 16a is formed at the end of the first housing 13, and the humidified air outlet 16b is formed at the end of the second housing 14.

Moreover, the humid air inlets 15a and 15b and the air outlet 17a and 17b may also be formed at the sides of the first housing 13 and the second housing 14, respectively, in the same manner as the conventional membrane humidifier. Here, one humid air inlet 15b and one air outlet 15a may be formed at the first housing 13, and the other humid air inlet 15a and the other air outlet 15b may be formed at the second housing 14.

Herein, with respect to the two the humid air inlets 15a and 15b, the humid air inlet 15a formed at the front end of the membrane humidifier 10 will be referred to as a first humid air inlet, and the humid air inlet 15b formed at the rear end of the membrane humidifier 10 will be referred to as a second humid air inlet. Moreover, with respect to the two air outlets 17a and 17b, the air outlet 17a formed at the rear end of the membrane humidifier 10 will be referred to as a first air outlet, and the air outlet 17b formed at the front end of the membrane humidifier 10 will be referred to as a second air outlet.

As shown in the longitudinal cross-sectional view of FIG. 4, the first humid air inlet 15a and the first air outlet 17a are formed at the front end and the rear end of the membrane humidifier 10, respectively, and thus are located diagonally from each other in the figure. Moreover, the second humid air inlet 15b and the second air outlet 17b are formed at the rear end and the front end of the membrane humidifier 10, respectively, and thus are also located diagonally from each other in the figure.

Meanwhile, an air line 31 connected from the cathode outlet of the fuel cell stack 20 is connected to the two humid air inlets 15a and 15b. Here, the air line 31 is branched into branch lines 31a and 32b connected to the humid air inlets 15a and 15b, respectively.

Moreover, an electric 3-way valve 32 that controls the flow of humid air supplied through the two branch lines 31a and 31b into the membrane humidifier 10 may be provided at the branch of the air line 31. The operation of the electric 3-way valve 32 may be controlled based on a control signal from a controller, not shown, and is configured to control the amount of humid air distributed to the two branch lines 31a and 32b and supplied to the first humid air inlet 15a and the second humid air inlet 15b.

Moreover, the 3-way valve may be configured to change flow paths such that the humid air is supplied to any one selected from the two humid air inlets 15a and 15b based on a control signal of the controller and, in this case, the 3-way valve selectively opens any one of the flow paths to the two branch lines 31a and 31b.

Furthermore, exhaust lines 33a and 33b are connected to the two air outlets 17a and 17b, respectively, and the exhaust lines 33a and 33b at both sides are combined into a single line such that the air discharged through the two air outlets 17a and 17b is finally discharged through the combined line.

In addition, an electric 3-way valve 34, whose opening and closing is controlled based on a control signal of the controller, is provided at the combined point where the two air outlets 17a and 17b are combined.

Herein, the 3-way valve 32 provided at the branch of the air line 31 will be referred to as a flow control valve, and the 3-way valve 34 provided at the combined point of the exhaust lines 33a and 33b will be referred to as an exhaust valve.

Here, the flow control valve 32 is an electric 3-way valve provided at the branch of the air line 31 to selectively open and close the flow paths to the branch lines 31a and 31b or to control the flow rate of humid air to the branch lines 31a and 31b. Moreover, the exhaust valve 34 is a 3-way valve may be configured to selectively open any one of two exhaust lines 33a and 33b at the front and rear ends or whose opening and closing is controlled to control the amount of air discharged through the two exhaust lines 33a and 33b.

As above, the configuration of the humidification apparatus for the fuel cell system in accordance with the exemplary embodiments of the present invention has been described in detail, and the operation thereof will be described below.

When the humid air discharged from the fuel cell stack 20 through the first humid air inlet 15a and the second humid air inlet 15b is introduced into the membrane humidifier 10, the humid air is brought into contact with the outer surface of the hollow fiber membranes 11c in the membrane humidifier 10 and is finally discharged to the air outlets 17a and 17b.

Moreover, the air introduced through the dry air inlet 16a is passed through the hollow fiber membranes 11c, discharged through the humidified air outlet 16b, and supplied to the cathode inlet of the fuel cell stack 20 in the same manner as the conventional membrane humidifier. Here, the dry air is humidified by the moisture exchange with the humid air passing through the outside of the hollow fiber membranes 11c and then supplied to the cathode of the fuel cell stack 20.

Moreover, the humid air introduced through the first humid air inlet 15a flows in a direction opposite to the flow direction of air being humidified in the hollow fiber membranes and is then discharged through the first air outlet 17a, and the flow of air flowing in a direction opposite to the flow direction of air being humidified is referred to as a counter-flow.

The air humidified while passing through the hollow fiber membranes 11c moves forward in the membrane humidifier 10, and thus the air in the counter-flow moves backward in the membrane humidifier 10 and passes therethrough. On the contrary, the humid air introduced through the second humid air inlet 15b flows in the same direction as the flow direction of air being humidified in the hollow fiber membranes and is then discharged through the second air outlet 17b, and the flow of air flowing in the same direction as the flow direction of air being humidified is referred to as a co-flow. Here, the air in the co-flow direction moves forward in the membrane humidifier 10 and passes therethrough.

As known in the art, in the case of the membrane humidifier 10, the transfer of heat and moisture is made through the membranes, and thus the humidification of dry air is achieved and the heat of humid air is transferred to the dry air. Accordingly, in terms of heat transfer, the same principle as general heat exchangers is employed.

Figure 5:
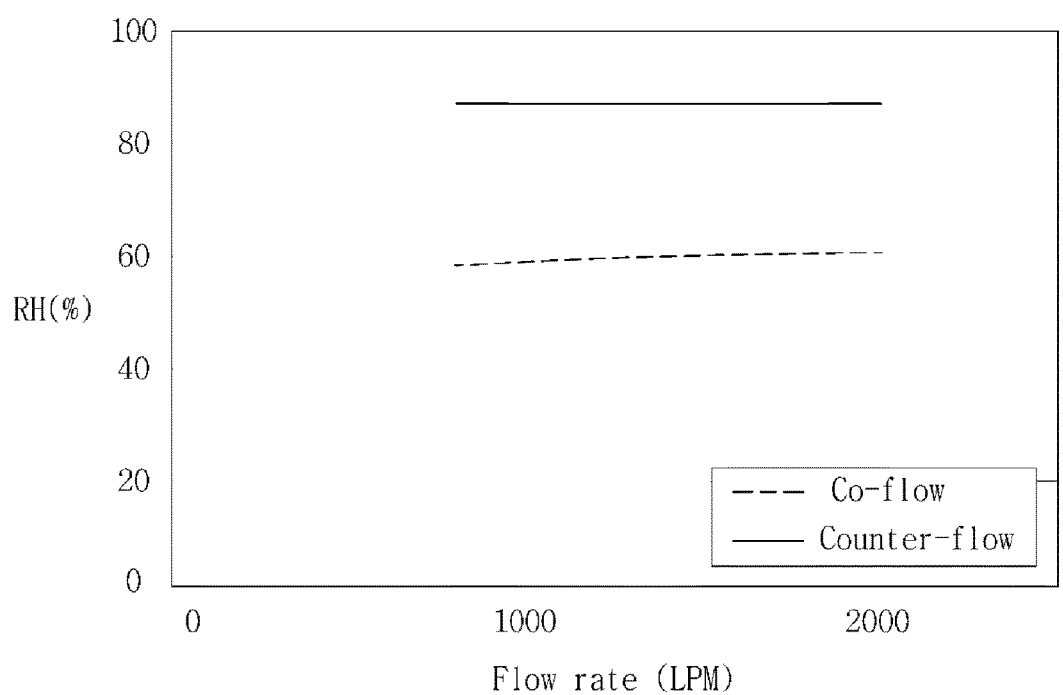
FIG. 5 is a graph showing the comparison of humidification performance in a co-flow and a counter-flow in a membrane humidifier.

Moreover, in the case of the conventional membrane humidifier, a highly efficient counter-flow design is employed, and between the two flows such as the counter-flow and the co-flow, the humidification performance is relatively better in the counter-flow, which is shown in FIG. 5.

FIG. 5 is a graph showing the comparison of the humidification performance in the co-flow and the counter-flow in the membrane humidifier, from which it can be seen that in the counter-flow, where the humid air passes through the membrane humidifier in a direction opposite to the flow direction of air being humidified, the amount of humidification is greater and the humidification performance is better than in the co-flow, where the humid air passes through the membrane humidifier in the same direction as the flow direction of air being humidified.

In view of these facts, the counter-flow and the co-flow are appropriately controlled based on operating conditions of the fuel cell stack 20 by the above-described configuration according to the present invention, thus controlling the amount of humidification to be suitable for the fuel cell stack 20. That is, in the humidification apparatus of the present invention, the controller controls the operation of the flow control valve 32 based on the operating conditions of the fuel cell stack 20, e.g., the output of the fuel cell stack 20 to control the flow rate of air introduced through the first humid air inlet 15a and the second humid air inlet 15b, thus optimally controlling the amount of humidification by the membrane humidifier 10.

In more detail, in low output and low current regions where the output (i.e., current output) of the fuel cell stack 20 is below a predetermined reference value, the opening and closing of the flow control valve 32 is controlled such that the humid air is supplied only through the first humid air inlet 15a, and thus the humid air flows in the counter-flow direction in the membrane humidifier 10. At this time when the humid air flows in the counter-flow direction, the dry air introduced through the dry air inlet 16a is humidified. At this time, the amount of air humidified is relatively large, and the air sufficiently humidified is discharged through the humidified air outlet 16b of the membrane humidifier 10 and supplied to the cathode of the fuel cell stack 20. Moreover, the air transferring its heat and moisture to the dry air is discharged through the first air outlet 17a and the exhaust line 33a in a state where the exhaust valve 34 is opened based on a control signal of the controller.

On the contrary, in a high current region where the flow rate is high, e.g., in high output and high current regions where the output of the fuel cell stack exceeds a predetermined reference value, the opening and closing of the flow control valve 32 is controlled so that the humid air is introduce into the membrane humidifier 10 through both the first humid air inlet 15a and the second humid air inlet 15b. Accordingly, the humid air flows in both the counter-flow and co-flow directions, and thus it is possible to relatively reduce the amount of humidification by the membrane humidifier 10. In these high output and high current regions, the controller may be configured to control the opening and closing of the flow control valve 32 and the exhaust valve 34 such that the flow rate of humid air in the co-flow direction increases as the output of the fuel cell stack 20 is higher.

Otherwise, in the high output and high current regions, the controller may be configured to control the opening and closing of the flow control valve 32 and the exhaust valve 34 such that the humid air can be introduced only through the second humid air inlet 15b, i.e., such that the humid air can pass through the membrane humidifier 10 only in the co-flow direction. As such, the humidification apparatus of the present invention can control the amount of dry air to be humidified by the membrane humidifier 10 based on the operating conditions of the fuel cell stack 20 and, in particular, can reduce the amount of humidification by the membrane humidifier 10 relatively in the high output and high current regions.

Moreover, it is possible to control the flow of air discharged from the fuel cell stack 20 through the above-described valve control, and thus it is possible to reduce the back pressure of the membrane humidifier at a high flow rate and, at the same time, reduce the load of the air blower.

Figure 6:
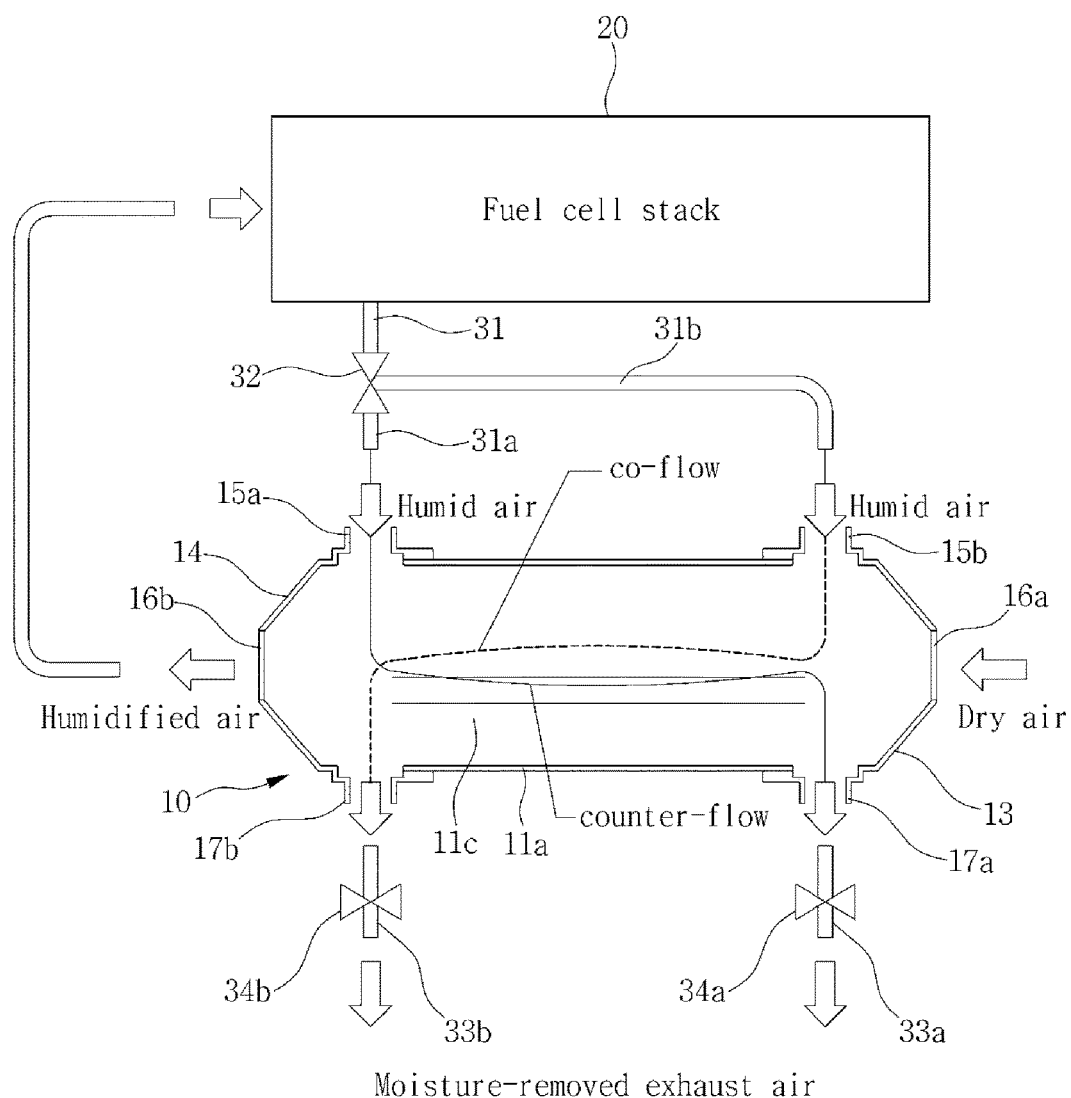
FIG. 6 is a schematic diagram showing the configuration of a humidification apparatus for a fuel cell system in accordance with another exemplary embodiment of the present invention.

Meanwhile, FIG. 6 is a schematic diagram showing the configuration of a humidification apparatus for a fuel cell system in accordance with another exemplary embodiment of the present invention, in which separate exhaust lines 33a and 33b are provided at the first air outlet 17a and the second air outlet 17b, respectively, and separate exhaust valves 34a and 34b, whose opening and closing is controlled based on a control signal of the controller, are provided in the exhaust lines 33a and 33b, respectively.

In the exemplary embodiment of FIG. 6, the exhaust valve 34a of the exhaust line 33a connected to the first air outlet 17a will be referred to as a first exhaust valve, and the exhaust valve 34b of the exhaust line 33b connected to the second air outlet 17b will be referred to as a second exhaust valve.

In the exemplary embodiment shown in FIG. 6, in the low output and low current regions, the second exhaust valve 34b is closed while the first exhaust valve 34a is open and, at the same time, the opening and closing of the flow control valve 32 is controlled such that the humid air discharged from the fuel cell stack 20 can be introduced only through the first humid air inlet 15a of the membrane humidifier 10. In this case, the humid air passes through the membrane humidifier 10 in the count-flow direction to relatively increase the amount of dry air humidified such that the air supplied to the fuel cell stack 20 is sufficiently humidified.

On the contrary, in the high output and high current regions, the second exhaust valve 34b is opened while the first exhaust valve 34a is closed and, at the same time, the opening and closing of the flow control valve 32 is controlled such that the humid air discharged from the fuel cell stack 20 can be introduced only through the second humid air inlet 15b of the membrane humidifier 10. In this case, the humid air passes through the membrane humidifier 10 in the co-flow direction to relatively reduce the amount of dry air humidified, thus controlling the amount of air humidified by the membrane humidifier 10 based on the operating conditions of the fuel cell stack 20.

As described above, the humidification apparatus for the fuel cell system according to the present invention has the following advantages.

It is possible to control the flow of air in the counter-flow direction and in the co-flow direction in the membrane humidifier by controlling the valves based on the operating conditions of the fuel cell stack, and thus it is possible to optimally control the amount of dry air to be humidified by the membrane humidifier. As a result, it is possible to effectively prevent the occurrence of flooding in the cathode of the fuel cell stack and solve various conventional problems such as performance reduction, local air starvation in the cathode, etc.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A non-transitory computer readable medium containing program instructions executed by a processor or controller, the computer readable medium comprising:
program instructions that control opening and closing of a flow control valve and an exhaust valve in a humidification apparatus based on an output of a fuel cell stack to control a flow rate of humid air in a counter-flow direction, where the humid air passes through a membrane humidifier in a direction opposite to a flow direction of air in hollow fiber membranes in the membrane humidifier, and the flow rate of humid air in a co-flow, where the humid air passes through the membrane humidifier in the same direction as the flow direction of air in the hollow fiber membranes of the membrane humidifier.

2. The non-transitory computer readable medium of claim 1, wherein in low output and low current regions where the output of the fuel cell stack is below a predetermined reference value, the controller blocks the introduction of humid air into the humid air inlet formed at the rear end of the membrane humidifier and controls the opening and closing of the flow control valve and the exhaust valve such that humid air introduced into the humid air inlet formed at the front end of the membrane humidifier passes through the membrane humidifier only in the counter-flow direction.

3. The non-transitory computer readable medium of claim 1, wherein in high output and high current regions where the output of the fuel cell stack exceeds a predetermined reference value, the program instructions control the opening and closing of the flow control valve and the exhaust valve such that humid air discharged from the cathode of the fuel cell stack is introduced into both the humid air inlets formed at the front and rear ends of the membrane humidifier and passes through the membrane humidifier in both the counter-flow and co-flow directions.

4. The non-transitory computer readable medium of claim 1, wherein in the high output and high current regions, the program instructions control the opening and closing of the flow control valve and the exhaust valve to increase the flow rate of humid air in the co-flow direction as the output of the fuel cell stack is higher.

5. The non-transitory computer readable medium of claim 1, wherein in high output and high current regions where the output of the fuel cell stack exceeds a predetermined reference value, the program instructions control the humidification apparatus to block the introduction of humid air into the humid air inlet formed at the front end of the membrane humidifier and controls the opening and closing of the flow control valve and the exhaust valve such that humid air introduced into the humid air inlet formed at the rear end of the membrane humidifier passes through the membrane humidifier only in the co-flow direction.

* * * * *